US012659299B2

(12) United States Patent 
Gopal et al.

(10) Patent No.: US 12,659,299 B2 
(45) **Date of Patent: \*Jun. 16, 2026**

(54) METHODS FOR REVALIDATING FQDN RULESETS IN A FIREWALL

(71) Applicant: VMware LLC, Palo Alto, CA (US)

(72) Inventors: Sushruth Gopal, Palo Alto, CA (US); Jayant Jain, San Jose, CA (US); Davide Celotto, Berkeley, CA (US); Josh Swerdlow, San Francisco, CA (US)

(73) Assignee: VMware LLC, Palo Alto, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/767,929

(22) Filed: Jul. 9, 2024

(65) Prior Publication Data

US 2024/0372835 A1 Nov. 7, 2024

Related U.S. Application Data

(63) Continuation of application No. 16/841,962, filed on Apr. 7, 2020, now Pat. No. 12,034,700.

(51) Int. Cl.
| | |
|---|---|
| *H04L 29/06* | (2006.01) |
| *G06F 9/455* | (2018.01) |
| *H04L 9/40* | (2022.01) |

(52) U.S. Cl.
CPC ...... *H04L 63/0263* (2013.01); *G06F 9/45558* (2013.01); *H04L 63/0236* (2013.01);
(Continued)

(58) Field of Classification Search
CPC ............ H04L 63/0263; H04L 63/0236; G06F 9/45558; G06F 2009/45587; G06F 9/45595
See application file for complete search history.

(56) References Cited

U.S. PATENT DOCUMENTS

| | | | |
|---|---|---|---|
| 12,034,700 | B2 | 7/2024 | Gopal et al. |
| 2019/0014088 | A1\* | 1/2019 | Subramaniyan .... H04L 63/0281 |

(Continued)

OTHER PUBLICATIONS ionos.com, "Fully Qualified Domain Name (FQDN) Explained", dated Jun. 9, 2019, https://www.ionos.com/digitalguide/domains/domain-administration/fqdn-fully-qualified-domain-name/, 10 pages.

(Continued)

*Primary Examiner* — Evans Desrosiers 
(74) *Attorney, Agent, or Firm* — King Intellectual Asset Management

(57) ABSTRACT

A method comprises: in response to detecting a new expression in a policy rule, updating a global version number to a new value; identifying a particular IP address that corresponds to an FQDN matching on the new expression; storing an entry comprising the particular IP address, the new expression, and an entry version number in a first data structure, the entry version number being assigned the new value; in response to detecting a new connection to a destination IP address: finding a matching entry in the first data structure corresponding to the destination IP address; determining whether the global version number matches the entry version number for the matching entry; and in response to determining that the global version number does not match the entry version number for the matching entry, sending update information to a slowpath process that associates an updated configuration information for the matching entry.

20 Claims, 8 Drawing Sheets

(52) U.S. Cl.
CPC .............. *G06F 2009/45587* (2013.01); *G06F 2009/45595* (2013.01)

(56)                       References Cited

U.S. PATENT DOCUMENTS

| | | | | |
|---|---|---|---|---|
| 2019/0036888 A1* | 1/2019 | Pularikkal | ........... | H04L 63/0236 |
| 2020/0259792 A1* | 8/2020 | Devarajan | ........... | H04L 63/1416 |
| 2021/0314299 A1 | 10/2021 | Gopal et al. | | |

OTHER PUBLICATIONS

U.S. Appl. No. 16/841,962, Non-Final Office Action dated Mar. 17, 2022, 30 pages.
U.S. Appl. No. 16/841,962, Final Office Action dated Dec. 1, 2022, 37 pages.
U.S. Appl. No. 16/841,962, Notice of Allowance dated Feb. 28, 2024, 89 pages.

* cited by examiner

102 Resolve an IP Address for a Domain Name

104 Find in an Expression Table, all IDs Assigned to Expression(s) that Match on the Domain Name 106 Include, in an IP-Domain Table, an Entry Having the IP Address, the Domain Name and the Matching ID(s)

108 Assign to the Entry, an Entry Version Number Corresponding to a Global Version Number of the IP-Domain Table 202 Detect a Rule Change 204 Update the Rule, in a Firewall Policy, According to the Change 206 Update a Corresponding Expression, in an Expression Table, According to the Change 208 Update a Global Version Number Associated with an IP-Domain Table

FIG. 3A

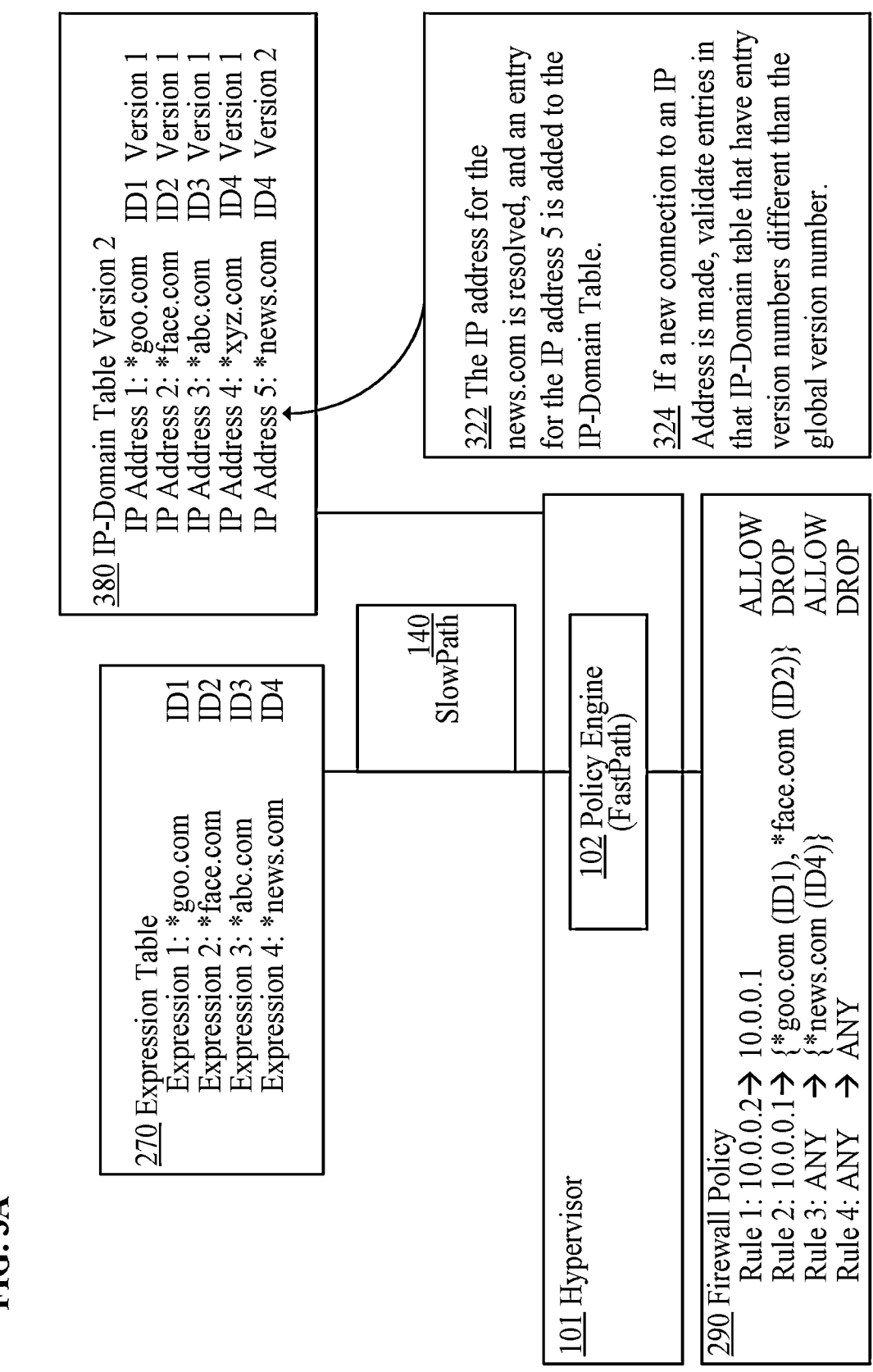

380 IP-Domain Table Version 2

IP Address 1: *goo.com      ID1   Version 1
IP Address 2: *face.com     ID2   Version 1
IP Address 3: *abc.com      ID3   Version 1
IP Address 4: *xyz.com      ID4   Version 1
IP Address 5: *news.com     ID4   Version 2

322 The IP address for the news.com is resolved, and an entry for the IP address 5 is added to the IP-Domain Table.

324  If a new connection to an IP Address is made, validate entries in that IP-Domain table that have entry version numbers different than the global version number.

270 Expression Table

Expression 1: *goo.com      ID1
Expression 2: *face.com     ID2
Expression 3: *abc.com      ID3
Expression 4: *news.com     ID4

140
SlowPath

102 Policy Engine
(FastPath)

101 Hypervisor

290 Firewall Policy

Rule 1: 10.0.0.2→ 10.0.0.1                                    ALLOW
Rule 2: 10.0.0.1→ {*goo.com (ID1), *face.com (ID2)}          DROP
Rule 3: ANY    →  {*news.com (ID4)}                          ALLOW
Rule 4: ANY    →  ANY                                         DROP 302 Resolve an IP Address for a Domain Name 304 Make an Entry, in an IP-Domain Table, including the IP Address, the Domain Name, and the ID 306 Assign, to the Entry, an Entry Version Number the Same as a Global Version Number

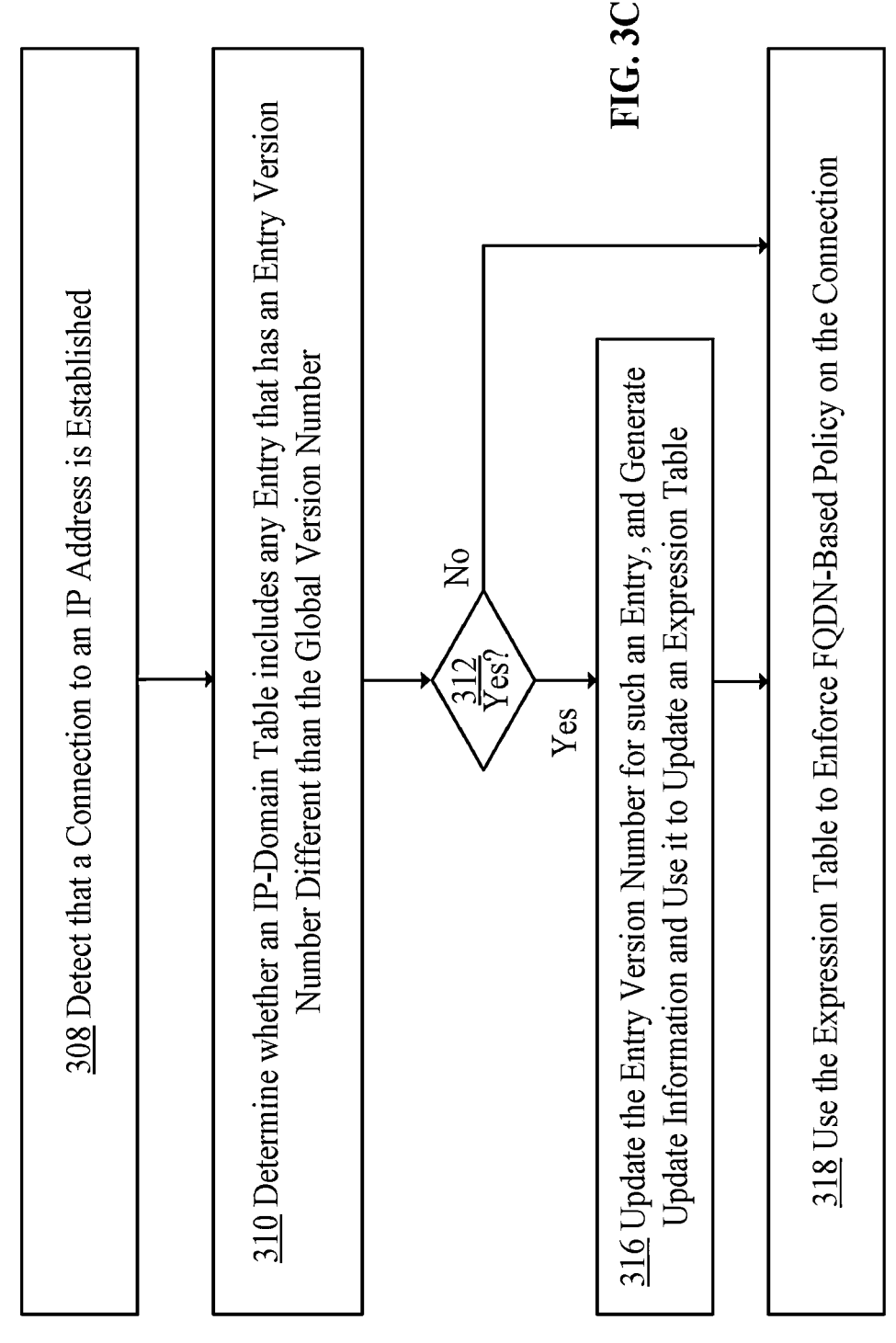

308 Detect that a Connection to an IP Address is Established

310 Determine whether an IP-Domain Table includes any Entry that has an Entry Version Number Different than the Global Version Number 312
Yes?

No

Yes

316 Update the Entry Version Number for such an Entry, and Generate Update Information and Use it to Update an Expression Table 318 Use the Expression Table to Enforce FQDN-Based Policy on the Connection

FIG. 3C

METHODS FOR REVALIDATING FQDN RULESETS IN A FIREWALL

BACKGROUND

A fully qualified domain name (FQDN) is a complete domain name of a computer or a host implemented on the Internet. FQDNs may be used to define FQDN expressions, and the FQDN expressions may be used to generate FQDN rules for computer-implemented firewalls.

Enforcement of FQDN rules in a firewall usually involves two types of processing: creating and applying the FQDN rules and managing the FQDN expressions implemented in the FQDN rules.

FQDN rules are usually created and used by a policy engine. A policy engine may be implemented as part of a fastpath process executing in a hypervisor of a host computer. A hypervisor is computer software, firmware, and/or hardware that creates and executes virtual machines. Virtual machines are virtualized computing instances realized as complete computational environments, containing virtual equivalents of hardware and/or software components of physical computing systems.

FQDN expressions implemented in FQDN rules may be managed by an expression matching engine. The expression matching engine may maintain an expression table configured to store the FQDN expressions used in the rules. An expression may include a domain name and an expression identifier (ID) that has been assigned to the expression.

An expression engine is usually configured to match on multiple FQDN expressions one-expression-at-the-time. The matching is usually implemented in a slowpath process of a host computer. Upon detecting a packet, the expression matching engine may perform a multi regex matching on each of the expressions stored in an expression table. If one or more matches are found, then the expression IDs corresponding to the matching expressions are returned, and a policy engine matches the returned IDs to the FQDN rules. If matching rules are found, then an action included in, for example, the highest-ranking-matching rule is performed on the packet.

The above assumes, however, that there is a definite (i.e., 1:1) mapping of FQDN expressions onto expression IDs. But that is rarely the case. In a typical firewall, the FQDN rules are continuously modified and updated, and so is the mapping.

Furthermore, FQDN rules implemented in a distributed firewall (DFW) or a next generation firewall (NGFW) may implement dynamic groups of FQDN rules and expressions. Thus, the mapping between the FQDN expressions and IDs may be dynamically created based on tags and other grouping constructs. Moreover, since validating FQDN expressions is usually performed as part of the DNS packet processing, refreshes of the domain names in expressions may depend on the timing of the DNS processing. Since the subsequent refreshes occur once the DNS cache expires (which is timed using a DNS time-to-live (TTL) parameter that unlikely can be modified by a security administrator), the mapping is rarely definite.

SUMMARY

Techniques are described herein for implementing methods for revalidating FQDN rulesets in a firewall. An example method allows handling FQDN rule configurations implemented in typical firewalls, DFWs and NGFWs. The approach is resilient to the consequences of restrictive DNS refreshes and rigid DNS TTL-based limitations.

Some embodiments provide a method for creating and maintaining a mapping between IP addresses, domain names and expression IDs implemented in a firewall. The mapping may be stored in an IP-Domain table, and the table may be used to validate an FQDN expression table as the FQDN rules are updated and modified. It should be understood that, while the use of tables is described herein for storing and associating data, other suitable types of data structures may be used.

Contents of an IP-Domain table may be populated using various approaches. According to one approach, an entry in an IP-Domain table is first populated when a DNS packet used to resolve a particular domain name associated with a particular policy rule to a corresponding IP address is detected. Then the IP-Domain table is validated when, in response to a rule modification, a new connection to the particular IP address is established by a host computer. Subsequently, an expression table is validated by validating an entry that includes an identifier of the expression that has been impacted by the rule modification.

To reduce the amount of churn caused by the frequent updating of the FQDN expressions for every newly established connection, two versioning schemes may be implemented. The schemes may be used to manage the updating of an IP-Domain table and an expression table. One versioning scheme may be implemented for the IP-Domain table itself, while another versioning scheme may be implemented for each entry included in the IP-Domain table. The versioning scheme for the IP-Domain table itself allows modifying a global version number of the IP-Domain table each time any of the FQDN rules is modified. The modifications of the global version number may include, for example, increasing a global version number assigned to the IP-Domain table or resetting the global version number if the number otherwise would exceed some upper threshold. Another versioning scheme is for individual entries in the IP-Domain table and allows modifying entry version numbers associated with the individual entries of the IP-Domain table. For example, if a new connection is made to a particular destination IP address, then an entry version number associated with the entry storing the particular destination IP address in the IP-Domain table may be increased or reset.

The versioning schemes may be used to validate entries in an expression table. For example, once a new connection is established to a particular destination IP address, the global version number of the IP-Domain table is compared to the entry version number of the entry in the IP-Domain table that stores that particular destination IP address. If those two versions are the same, then no validation of the expression table is needed.

However, if the two versions are different, then the expression table may be validated. This may include generating update information. The update information may include a particular destination IP address and a particular expression (both taken from the entry, in the IP-Domain table, that stores the particular IP address). In some embodiments, a pointer to a descriptor of the update information is communicated to an expression matching engine to cause the engine to refresh one or more entries, in the expression table, that include the particular expression.

Validating/revalidating an expression table allows ensuring that firewall rules are applied to packets correctly. For example, if an FQDN rule containing a particular expression and a particular ID is modified by replacing the particular expression with a new expression, then the expression table may also be modified by modifying the entry, in the expression table, that stores the particular expression and the particular ID, by removing the particular ID so that a policy engine may correctly apply the modified FQDN rule to the packets.

Validating/revalidating an expression table is usually an expensive operation. To reduce the cost, the validation is typically performed when a new connection is established for one, not each, flow to an IP address for which a corresponding expression was modified in a FQDN rule. Hence, only one flow per IP address pays the price for validating the expression identifier in the table. Once the entry in the table is refreshed, all subsequent flows to the same IP address take an advantage of the updated table.

BRIEF DESCRIPTION OF THE DRAWINGS

In the drawings:

FIG. 3A is a block diagram depicting an example of updating an IP-Domain table;

FIG. 3C is an example flow chart for validating an IP-Domain table in response to establishing a new connection.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring of the present approach.

Figure 1A:
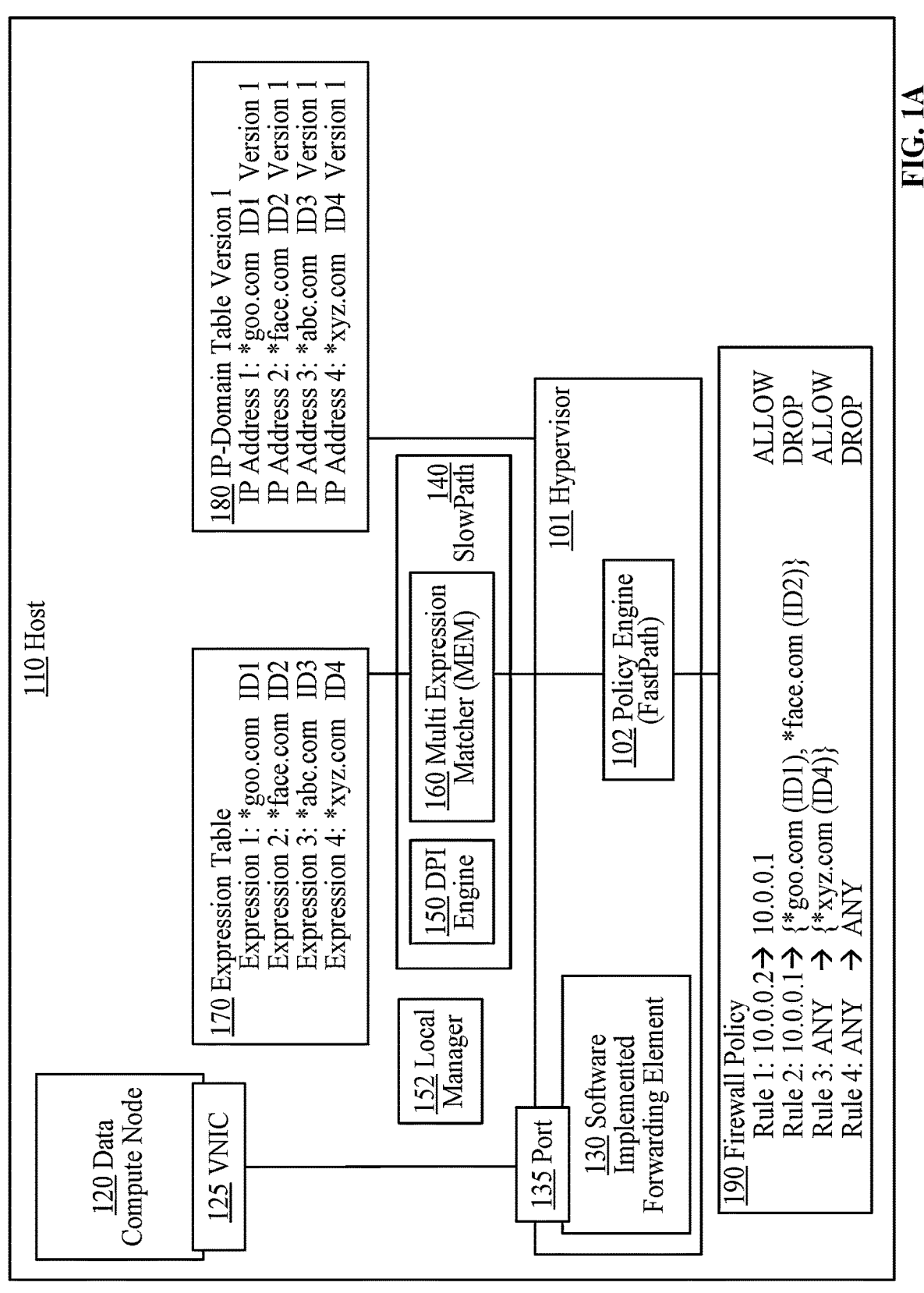
FIG. 1A is a block diagram depicting an example system architecture for implementing a method for revalidating FQDN rulesets in a distributed firewall.

Some embodiments provide a method for revalidating FQDN rulesets in a firewall. The method includes creating and maintaining an IP-Domain table that includes a mapping between IP addresses, domain names and expression IDs. The IP-Domain table is used to facilitate a validation and revalidation of an expression table that, in conjunction with firewall rules, is used to implement the firewall policies.
Example System Architecture FIG. 1A is a block diagram depicting an example system architecture for implementing a method for revalidating FQDN rulesets in a firewall. In the depicted example, a host machine (i.e., a host) 110 implements one or more data compute nodes 120, a hypervisor 101, an expression table 170, an IP-Domain table 180, a firewall policy 190, and other processes, data structures, tables, and the like.

Host 110 may comprise a physical server computer or other computing device having memory (not separately shown) one or more processors or compute engines (not separately shown) input-output device(s), and other physical hardware necessary for proper execution of software instructions stored in the memory. Hypervisor 101, data compute nodes 120, and slowpath process 140 comprise software instructions and, during execution thereof, state information maintained in the memory. Tables 170, 180, and 190 comprise data structures for maintaining relevant data as described in detail below.

Hypervisor 101 may be implemented as a software layer, firmware or hardware that supports execution of one or more compute nodes 120. Hypervisor 101 may be configured to implement forwarding element 130 that facilitate data communication between compute nodes 120 executing on host 110 and compute nodes executing on other hosts (not shown). In some embodiments, forwarding element 130 and other components (not shown) may reside in a privileged virtual machine (not shown), sometimes referred to as a "Domain Zero" or a "root partition" (not shown). Hypervisor 101 may maintain mappings between underlying hardware (not shown) and virtual resources, including virtual processor and guest memory resources, allocated to the respective compute nodes. In an alternate embodiment, hypervisor 101 may be replaced with an operating system kernel.

A data compute node 120 may be implemented as a virtual machine that operates in conjunction with hypervisor 101, or a container or a pod (such as a namespace, a Docker container, and the like), or other virtualized data compute node configured to operate on host 110, with or without hypervisor 101. Compute node 120, may implement a web server, an application server, a database server, microservice, or the like.

Data compute node 120 may include a virtual network interface controller (VNIC) 125 through which data compute node 120 may send and receive messages. VNIC 125 may be implemented as a software abstraction created by hypervisor 101 executed on host 110 to virtualize one or more physical network interface controllers (PNICs) (not shown) of host 110. In the case where data compute node 120 is a container, pod, or other computing abstraction, VNIC 125 may correspond to a virtual interface having an IP address. The term, "IP address" herein refers to a Layer 3 address, and may comprise IPv4, IPV6, or other Layer 3 address. By way of example only, IPv4 addresses are described herein, but the mechanism described herein for implementing firewall policies employing an FQDN expression will function for any such addressing scheme.

VNIC 125 may be configured to enable data compute node 120 to send messages to a software implemented forwarding element 130 implemented in hypervisor 101, and to receive messages from forwarding element 130. The messages may be provided to forwarding element 130 via a port 135.
Policy Engine Policy engine 102 may execute in hypervisor 101 and may be configured to store policies and rules in a policy data structure. Policy engine 102 may also be configured to determine whether a detected packet may be forwarded to its destination. Policy engine 102 may make that determination by performing function calls to one or more modules that implement firewall policy 190 configured to store the firewall policies and rules. Policy engine 102 may be implemented as part of a fastpath process, and may cooperate with a slowpath process 140, as well as other modules, including the modules configured to perform, for example, an ARP and DHCP broadcast suppression, load balancing, and network address translation. In some embodiments, policy engine 102 is implemented in a kernel space of hypervisor 101.

Other modules, such as slowpath process 140, may be implemented in a user space of host 110.

A management plane (not shown) or a local manager 152 may receive firewall rules from a system administrator and/or a user and push the policies and the rules to policy engine 102. Policy engine 102 may use firewall policy 190 to store one or more rule sets of the firewall policy. The rule sets may include various types of rules, including the rules that match on layer 2 (L2) header field values, as well as the rules that match on L3, L4 and even higher layers' header field values. The rules are usually organized according to their respective priorities and are applied to packets according to those priorities. A firewall rule may, for example, match on the packet's 5-tuple to determine the action specified in the rule to be performed with respect to the packet. A 5-tuple may include a source IP address, a destination IP address, a source port, a destination port, and a transport protocol identifier. Examples of specific actions may include dropping the packet, allowing the packet, and the like.

Firewall Policy

Firewall policy 190 may be configured to store policies and rules. Policy engine 102 may receive the policies and the rules from a management plane (not shown) and/or from local manager 152. For example, a management plane (or local manager 152) may push a rule to policy engine 102, and policy engine 102 may determine how to store the rule in firewall policy 190.

Policy engine 102 may receive a rule that may include a source, a destination, an expression identifier, and a specific action. An expression identifier is an identifier that has been assigned, by a management plane or local manager 152, to an expression used to determine whether the destination (or the source) match. For example, suppose that the destination is an IP address that can be resolved to a destination FQDN that is http://www.xyz.com. Suppose that an expression table (described in detail later) stores an entry that includes an expression *xyz.com. The destination FQDN matches on the expression *xyz.com because the string "xyz.com" is included in http://www.xyz.com. Suppose, as explained later, that an ID4 is assigned to the expression *xyz.com. In this example, the rule may include the source, the destination, the ID4, and a specific action.

The management plane (or local manager 152) may also provide expressions, such as an expression *xyz.com described above, to a slowpath process or to policy engine 102 (and policy engine 102 can send the expressions to the slowpath process for storing in expression table 170). Expression table 170 is described in detail later. For the clarity of the description, it is assumed at this point that expression table 170 has been already created and includes expressions 1-4 shown in FIG. 1A.

Upon receiving a rule from a management plane or local manager 152, policy engine 102 may parse the rule and identify, in the rule, a source address, a destination address, and an action (e.g., allow, drop). A source address may be a specific IP address (e.g., 10.0.0.2), a term "ANY" that indicates any IP address, or another type of address (not shown in FIG. 1A). Similarly, a destination address may be a specific IP address (e.g., 10.0.0.1), a term "ANY" that indicates any IP address, another type of address.

Suppose that a source IP address is "ANY," a destination address is a destination IP address, and an action is "allow." Upon receiving this rule, policy engine 102 determines a domain name for the destination IP address. This may include looking up, for example, a domain table, to determine the domain name that is associated with the destination IP address. (The details of this step are described later.) Once policy engine 102 determines the destination domain name, policy engine 102 uses expression table 170 to identify expression(s) that matches on the domain name.

In the description below, the following notation is used: a full domain name may be expressed as, for example, "http://www.xyz.com/", and example expressions that match on the http://www.xyz.com/domain name may include "*xyz.com", "*yz.com", "*z.com", and "*com". The * indicates a wildcard. For the clarity of the description, instead of referring to the full domain name, such as, for example, "http://www.xyz.com/", a partial domain name, such as, for example, xyz.com, is used.

Suppose that policy engine 102 determined that a destination (partial) domain name of a destination, corresponding to a destination IP address included in the rule, is "xyz.com". Suppose that expression table 170 includes an entry "expression 4: *xyz.com ID4." (The details of each entry in expression table 170 are described later.) Continuing with our example, since *xyz.com matches on the domain name xyz.com (note here that * is a wild card representing any character or a string of characters preceding xyz.com), policy engine 102 identifies "expression 4: *xyz.com ID4" as matching on the domain name xyz.com. An an expression identifier included in the expression_4 is an ID4. Thus, policy engine 102 stores, in firewall policy 190, a rule that includes "ANY" as a source IP address, {*xyz.com (ID4)} as a destination, and a special action.

It should be noted that an expression identifier, such as the ID4 included in the rule is an actionable term, while the expression itself, such as *xyz.com, is not. Continuing with our example, only the ID4 can be used to perform a rule-to-packet matching, not the expression *xyz.com. For example, upon receiving a packet, policy engine 102 may use the ID4, not the expression *xyz.com, to determine whether a match between a destination domain name of a destination domain and any of the expression stored in expression table 170 exists. The expression *xyz.com is included in the rule in firewall policy 190 for non-matching purposes, such as bookkeeping, etc.

The above rule is shown in FIG. 1A as a Rule_3. The Rule_3 indicates that a packet from any source and destined to any destination matching on an expression that has assigned the ID4 will be allowed. An example of such an expression is "expression 4: *xyz.com ID4".

However, had expression table 170 included not only "expression 4: *xyz.com ID4", but also "expression 14: *yz.com ID14" (not shown), then policy engine 102 would store, in firewall policy 190, a rule that would include "ANY" as a source IP address, and {*xyz.com (ID4), *yz.com (ID14)} as "destinations." This rule is not shown in FIG. 1A. However, this rule would indicate that a packet from any source and destined to any destination having a domain name matching on *xyz.com (which has a corresponding ID4 in expression table 170) or *yz.com (which has a corresponding ID14 in expression table 170) will be allowed.

Referring again to firewall policy 190 depicted in FIG. 1A, firewall policy 190 includes rules 1-4, each generated using the approach described above. The Rule_3 was described in detail above. The remaining rules include rules 1-2 and 4.

A Rule_1 matches on packets having a source IP address 10.0.0.2 and a destination IP address 10.0.0.1, and states that a packet sent from 10.0.0.2 and destined to 10.0.0.1 will be allowed.

A Rule_2 matches on packets having a source IP address 10.0.0.1 and a destination having a domain name that matches on either *goo.com (ID1) or *face.com (ID2) will be dropped. According to the Rule_2, a packet sent from 10.0.0.1 and destined to any domain having a domain name that matches on "*goo.com" or "*face.com" (where the * indicates a wildcard string value) will be dropped.

A Rule_4 matches on packets having ANY source and on ANY destination. According to the Rule_4, unless any of the Rules 1-3 applies to a packet, the packet will be dropped.

In some embodiments, each rule has an assigned priority (for example, 1, 2, 3 or 4) and the priorities may be ordered from the highest priority of 1 to the lowest priority of 4. According to our example, the Rule_1 has the highest priority, while the Rule_4 has the lowest priority.

Ip-Domain Table

IP-Domain table 180 is used to ensure that FQDN rules are properly applied to packets even though the rules may be dynamically and frequently updated in firewall policy 190. Specifically, IP-Domain table 180 is used to ensure that a mapping, stored in an expression table 170 (described in detail later), between FQDN expressions and corresponding IDs is reliable even if the rules stored in firewall policy 190 are repeatedly modified. It should be noted that IP-Domain table 170 may also be implemented as any other type of data structure, not necessarily a table.

IP-Domain table 180 may represent a mapping between IP addresses, domain names and expression IDs used in FQDN rules implemented in a firewall. Entries in IP-Domain table 180 may be first populated when DNS packets to resolve the IP addresses are detected, and then validated each time when a new connection to any of the resolved IP addresses is established by a host computer.

IP-Domain table 180 may have associated a global version number. Initially, the global version number may be set to 1, or any other initial value. The global version number may be advanced, e.g., incremented or decremented (and eventually reset if it reaches a certain threshold value), each time any of the rules in firewall policy 190 is modified.

IP-Domain table 180 may include a plurality of entries, and each entry in table 180 may have associated an entry version number. Initially, an entry version number for each entry may be set to 1, or any other initial value. As described later, an entry version number of a particular entry in IP-Domain table 180 may be compared with a global version number of IP-Domain table 180 to determine whether a particular FQDN expression entry in expression table 170 needs to be updated so that the rule that relies on the particular FQDN expression is properly applied to packets.

An example of the already-populated IP-Domain table 180 is shown in FIG. 1A. The example is provided herein to merely illustrate a simple table 180 and is not meant to be limiting in any way. The already populated entries include: "IP Address 1: *goo.com ID1 Version 1," "IP Address 2: *face.com ID2 Version 1," "IP Address 3: *abc.com ID3 Version 1," and "IP Address 4: *xyz.com ID4 Version 1." An example process of populating IP-Domain table 180 is described in FIG. 1B.

Populating an IP-Domain Table

Figure 1B:
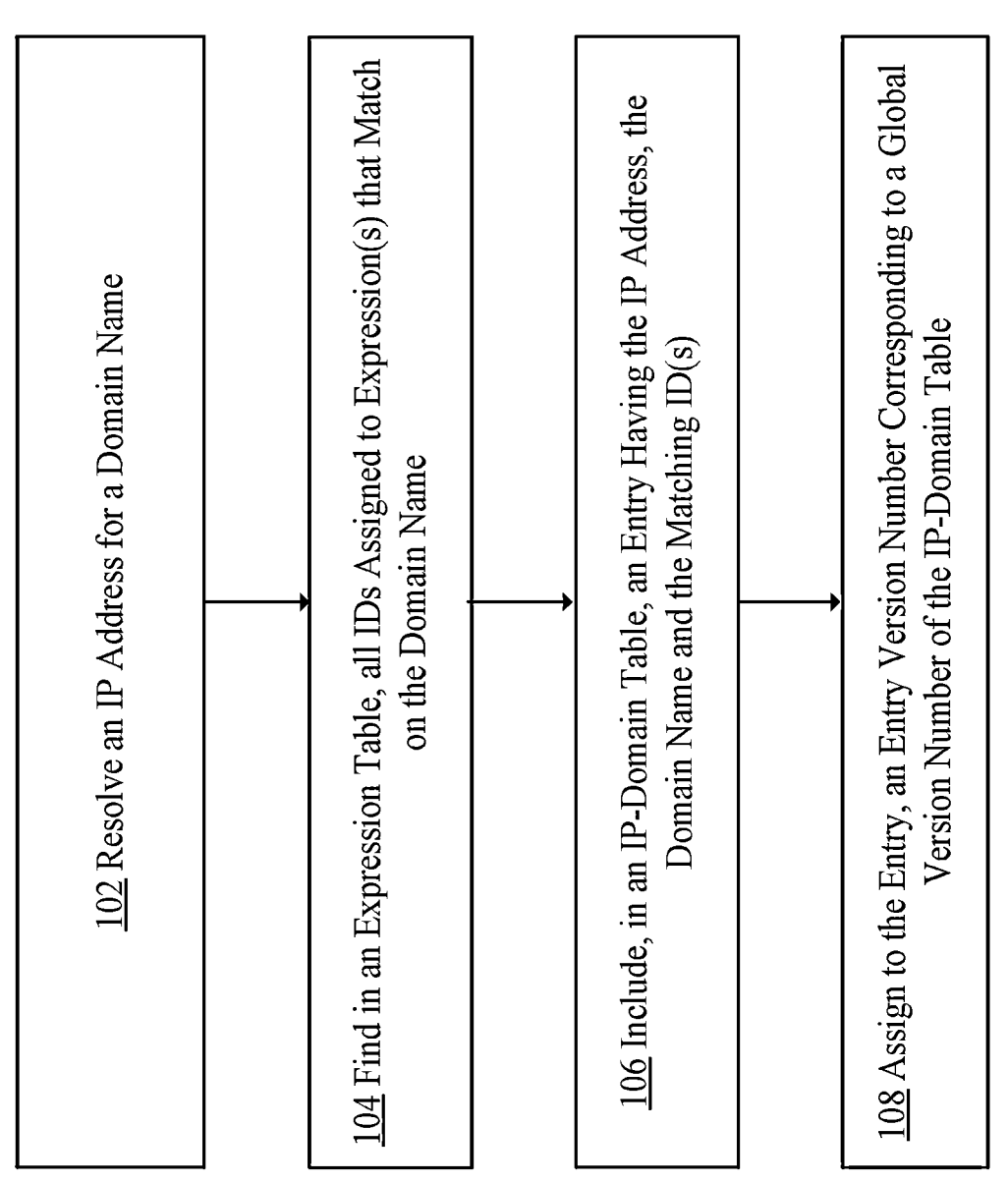
FIG. 1B is an example flow chart for populating an IP-Domain table.

FIG. 1B is an example flow chart for populating an IP-Domain table. As described above, entries in IP-Domain table 180 may be first populated when DNS packets to resolve the IP addresses for domains are detected. IP-Domain table 180 may be populated by, for example, a local manager 152 executing on host 110. In some embodiments, local manager 152 may be executing in a user space of host 110 (as shown in FIG. 1A). In other embodiments (not shown), a local manager may be implemented in hypervisor 101. For example, a local manager may be implemented in policy engine 102 of hypervisor 101, or as an agent implemented in hypervisor 101 and cooperating with policy engine 102.

Suppose that a request to access the domain having a domain name http://www.xyz.com/ is sent by data compute node 120 to a DNS server (not shown). Upon receiving the request, the DNS server resolves the domain name to an IP address. Continuing with our example, the DNS response, also referred to herein as a DNS packet, is from the DNS server addressed to the originating device, e.g., data compute node 120. This DNS packet may include the resolved IP address and the domain name, which can be extracted by hypervisor 101 using a deep packet inspection routine (not shown). The domain name and corresponding IP address are then passed to policy engine 102.

Referring to FIG. 1B, in step 103, a DNS packet is received or intercepted at hypervisor 101. The DNS packet may be a response packet from a DNS server or cache that includes an IP address for a domain name. Continuing with the above example, suppose that the IP address resolved for http://www.xyz.com/is IP_Address_4.

In step 104, policy engine 102, or a slowpath process 140, searches expression table 170 for all expressions that match on the partial domain name xyz.com. As shown in FIG. 1A, expression table 170 includes an entry "expression 4: *xyz.com ID4", where *xyz.com matches on the partial domain name xyz.com. This is because *xyz.com matches on xyz.com. (The wild card * indicates any character or a string of characters that may precede xyz.com.) An expression identifier that is included in "expression 4: *xyz.com ID4" is the ID4. Hence, the ID4 is an expression identifier that is included in the expression that matches on xyz.com.

Suppose, however, that expression table 170 also includes an entry "expression 10: *yz.com ID7" (not shown) and an entry "expression 11: *z.com ID8" (not shown). Since *yz.com matches on xyz.com, the identifier ID7 would also be recognized as an identifier that is included in an expression that matches on the partial domain name xyz.com. Furthermore, since *z.com also matches on xyz.com, the identifier ID8 would also be recognized as an identifier included in the expression that matches on the partial domain name xyz.com. In this hypothetical example, all three IDs (i.e., ID4, ID7 and ID8) would be recognized as included in the expressions that match on xyz.com.

However, for the clarity of the description, let us assume that expression table 170 includes only expressions 1-4, and does not include expressions 7-8. Hence, the ID that is included in the expression that matches on xyz.com is only the ID4.

In step 106, the agent populates, in IP-Domain table 180, an entry for IP_Address_4, and includes, in that entry, IP_Address_4, the expression (taken from expression table 170) that has the ID4, and the ID4. Hence, the populated entry includes IP_Address_4, *xyz.com, ID4.

In step 108, an entry version number for the entry in IP-Domain table 180 is determined and added to the entry in IP-Domain table 180. Since the entry is being populated, not updated, the entry version number will correspond to the global version number of IP-Domain table 180. Continuing with our example, since the global version number of IP-Domain table 180 is 1, the entry version number for the populated entry in IP-Domain table 180 is also 1. Thus, the populated entry now includes IP_Address_4, *xyz.com, IP4, Version 1.

Entries for other IP addresses are populated in IP-Domain table 180 using the same approach as the approach described above. Continuing with our example, the populated IP-Domain table 180 will include "IP Address 1: *goo.com ID1 Version 1," "IP Address 2: *face.com ID2 Version 1," "IP Address 3: *abc.com ID3 Version 1," and "IP Address 4: *xyz.com ID4 Version 1."

The exemplary architecture described in FIG. 1A is provided merely as an example of many possible configuration for a system implementing the disclosed methods for revalidating FQDN ruleset in firewalls. In other embodiments, the firewall rules are implemented in, for example, software implemented forwarding element 130 or in MEM 160 of the slowpath process implemented in a user space. In some other embodiments, MEM 160 may be implemented in a virtualization software kernel. In addition, in some embodiments, policy engine 102 is part of a datapath for a software forwarding element port that does not connect directly to VNIC 125 of data compute node 120. In some embodiments, a gateway forwarding element equipped with ports is deployed to exchange logical network traffic with physical networks external to the logical network, and the ports may be configured with their own individual policy engines and/or expression matchers.

Example Expressions

As described above, a management plane or local manager 152 provides rules to policy engine 102, and also provides expressions that an expression engine 160 stores in expression table 170. Expression engine 160, also referred to as a multi-expression matcher ("MEM") 160, may receive the expressions at the time when the rules and polices are being generated and stored in firewall policy 190. When expression engine 160 receives the expressions, expression engine 160 also receives the expression identifiers that have been assigned to the expressions by a system administrator or a user.

Suppose that expression engine 160 received an expression and an expression identifier that has been assigned to the expression by a system administrator. Upon receiving the expression and the expression identifier, expression engine 160 stores the expression and the identifier in expression table 170. It should be noted that expression table 170 may also be implemented as any other type of data structure, not necessarily a table.

In the example depicted FIG. 1A, expression table 170 includes four expressions. A first expression includes *goo-.com and an assigned identifier "ID1." A second expression includes *face.com and an assigned identifier "ID2." A third expression includes *abc.com and an assigned identifier "ID3." A fourth expression includes *xyz.com and an assigned identifier "ID4."

Expression engine 160 may receive updates to the expressions when the rules are modified. Receiving the updates is triggered by a rule modification. The rule and expression modifications are described in detail in FIG. 2A-2B.

Rule Modifications

Rules stored in firewall policy 190 may be modified, and the modification may be requested by a management plane or a local manager in response to receiving rule modification requests from a system administrator or a user. A modification to a rule may include, for example, replacing, in a list of expressions included in the rule, one expression with another expression. Other modifications may include adding an expression to a rule or removing an expression from a rule. Other modifications may include deleting an entire rule from firewall policy 290 and/or adding a new rule to firewall policy 290.

Figure 2A:
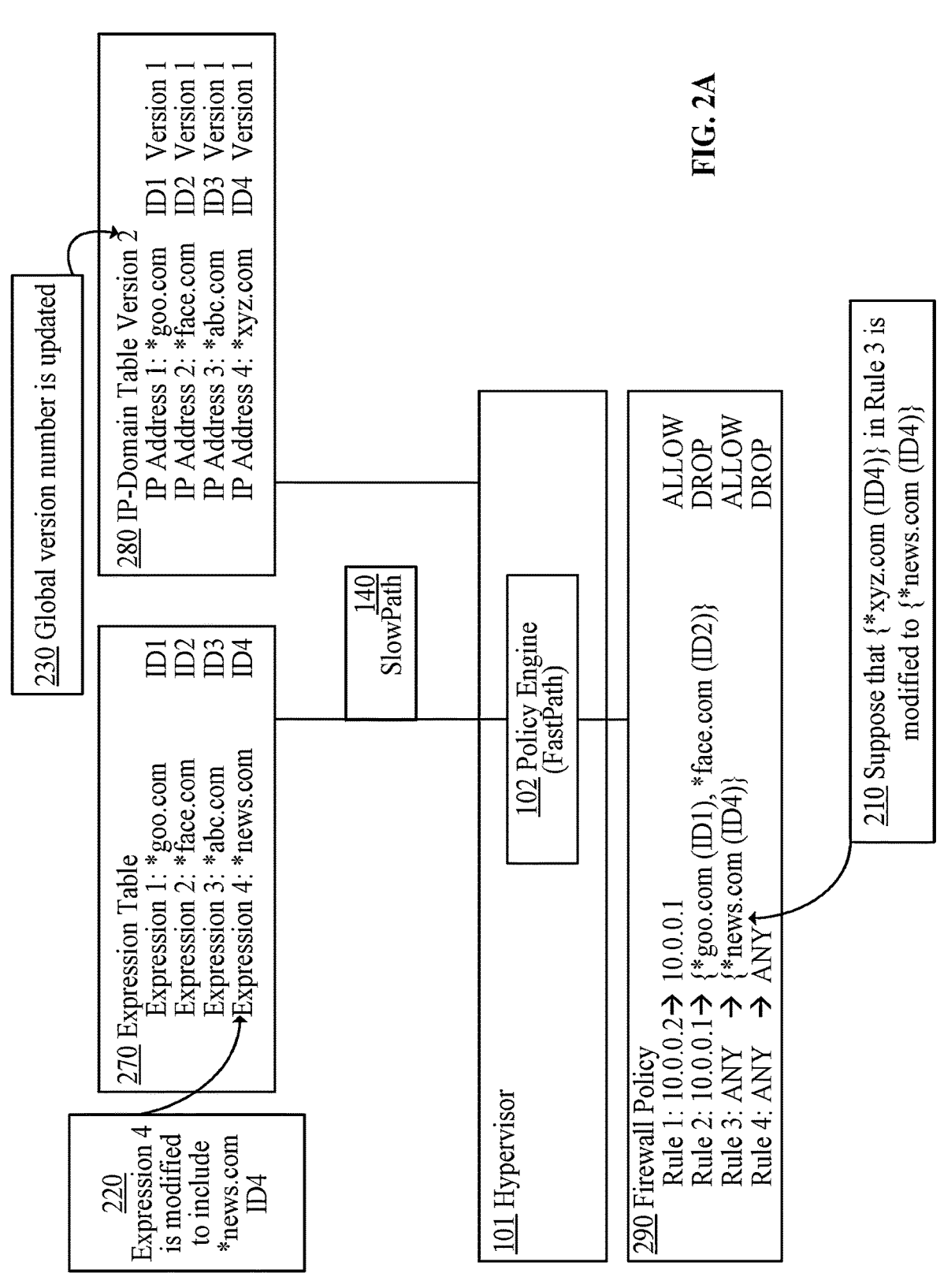
FIG. 2A is a block diagram depicting an example of a rule modification.
Figure 2B:
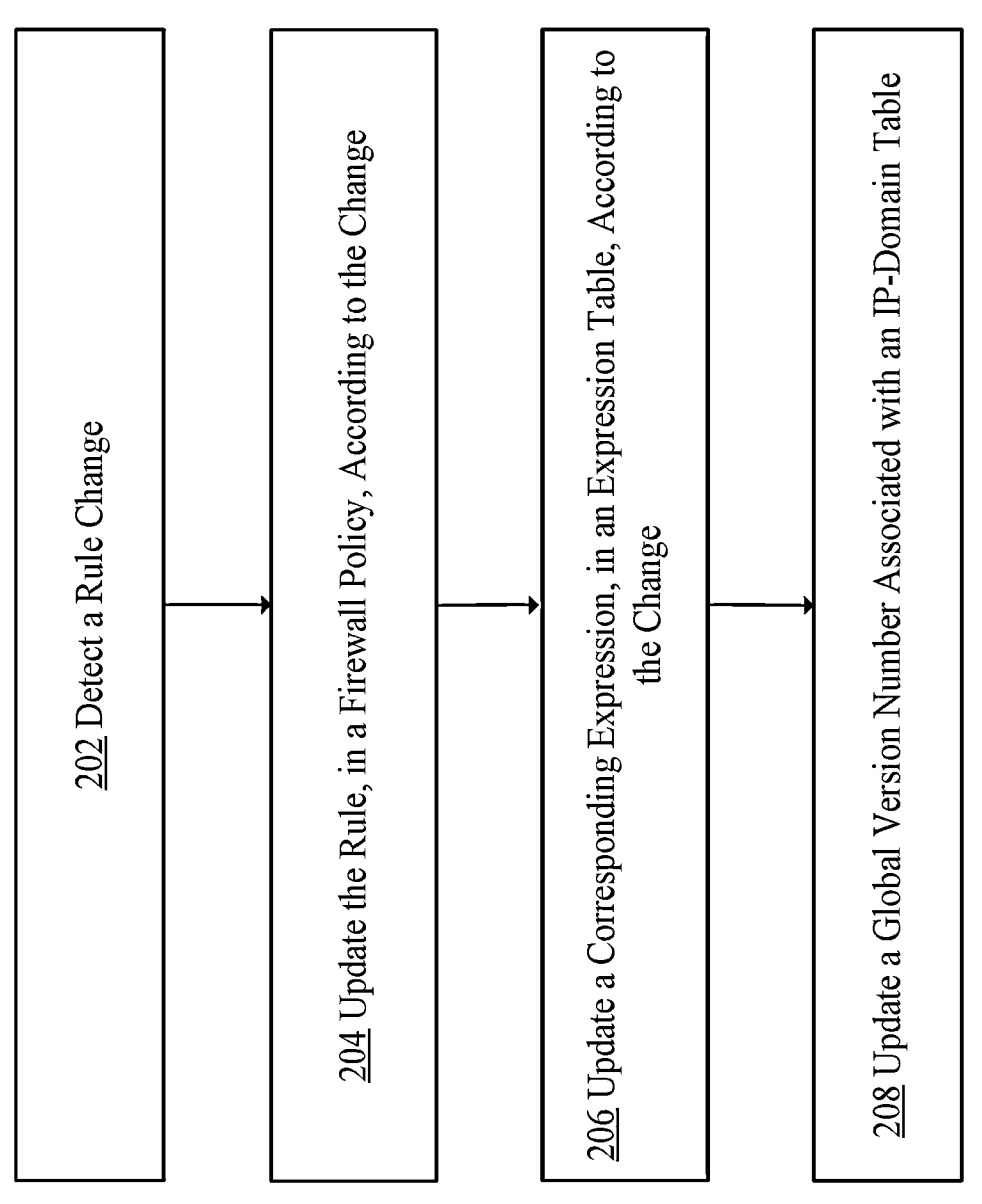
FIG. 2B is an example flow chart for updating an expression table in response to a rule modification.

FIG. 2A is a block diagram depicting an example of a rule modification and FIG. 2B is an example flow chart for updating an expression table in response to a rule modification.

In step 202 of FIG. 2B, a policy engine detects a rule change. Suppose, that the change pertains to replacing, in a list of expression for one rule, one expression with another expression.

In step 204 of FIG. 2B, the rule is updated in the expression table. As indicated using an operation 210 in FIG. 2A, the example Rule_3 in firewall policy 290 has been modified by replacing, in a list of expressions included in the Rule_3, the expression "*xyz.com" with "*news.com." Note, however, that the ID in the list for the Rule_3 has not been changed. That means that {*xyz.com (ID4)} in the expression list for the Rule_3 is modified to {*news.com (ID4)}.

In step 206 of FIG. 2B, in response to modifying the Rule_3 in firewall policy 290, an expression table 270 is also modified. As indicated using an operation 220 in FIG. 2A, "Expression 4: *xyz.com.com ID4" is modified to "Expression 4: news.com ID4". Once expression table 270 is modified to reflect the rule modification, the modified rule is "realized," i.e., its modification is completed.

In step 208 of FIG. 2B, a global version number that is assigned to an IP-Domain table 280 is modified. As indicated using an operation 230 in FIG. 2A, the global version number is increased from 1 to 2. Hence, the current global version number is 2. This example is provided to provide a clear description and is not limiting in any way.

Updating an Ip-Domain Table

In a stateful firewall, whenever a rule in a firewall policy is modified, a state for the rule needs to be validated. Thus, if a rule is modified, then the IP-Domain table needs to be updated.

Figure 3B:
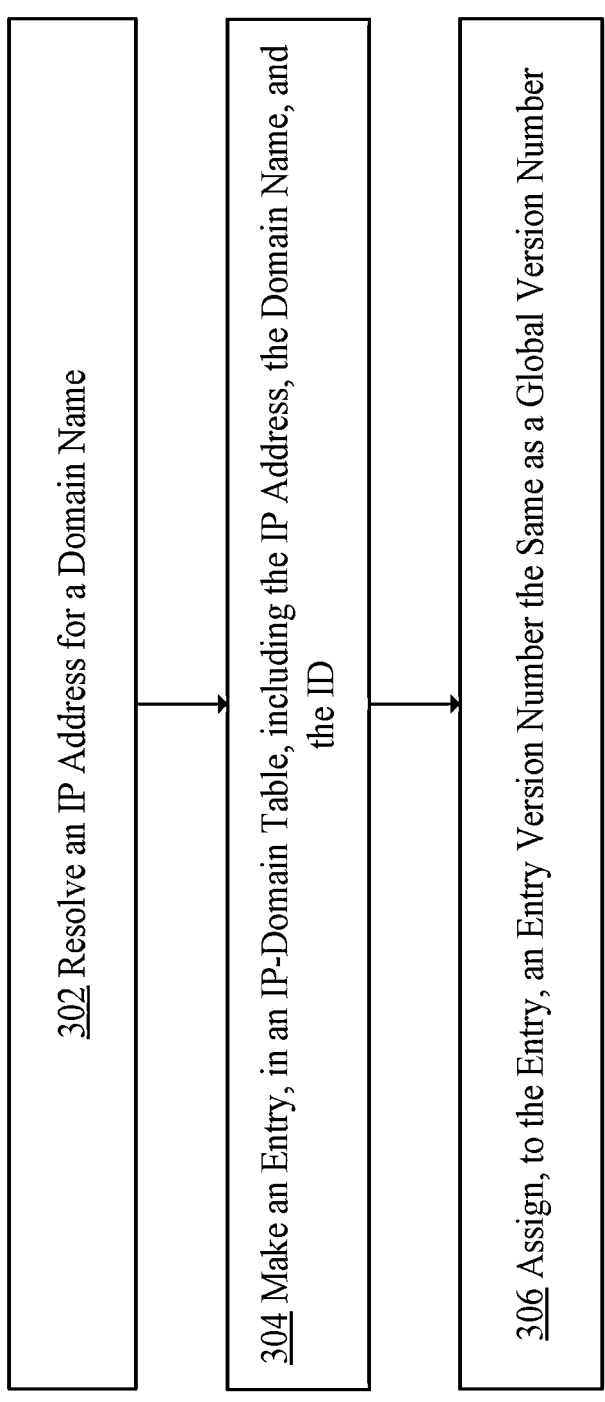
FIG. 3B is an example flow chart for updating an IP-Domain table in response to a rule modification.

FIG. 3A is a block diagram depicting an example of updating an IP-Domain table, and FIG. 3B is an example flow chart for updating an IP-Domain table in response to a rule modification.

Continuing with the example described in FIG. 3A, suppose that the Rule_3 was changed by replacing the expression *xyz.com in a list for the Rule_3 with the expression *news.com, but an ID in the list has not been changed. Once Rule_3 is modified, a particular IP address, corresponding to a domain name that matches on the expression *news.com, needs to be resolved.

In step 302 of FIG. 3B, the particular IP address, corresponding to the domain name that matches on the expression *news.com" is resolved As explained above, an IP address may be resolved by performing a lookup in a cache or DNS table for an IP address that was already proactively (or previously) queried using a DNS query (that included a domain name that matches on the expression *news.com)—provided that the DNS TTL value for storing that entry in the cache has not expired. However, if the IP address is taken from the cache, but a new rule requires that packets cannot be forwarded to a corresponding particular domain, then the new rule would affect existing communications to the particular domain until the DNS mapping is forgotten (i.e., when the DNS TTL for that IP address entry expires) and a new DNS response is received. Alternatively, an IP address may be resolved by issuing a DNS query including a domain name that matches on the "*news.com" expression and waiting for a DNS response with the particular IP address. Suppose that the particular IP address is IP_Address_5.

Assuming that the IP address is resolved, in step 304 of FIG. 3B, a new entry in an IP-Domain table 380 is created.

The entry is filled in with the IP address, the expression that is included in the modified rule, and the expression identifier that is assigned to the expression in the modified rule. Continuing with the example described in FIG. 2A, if the Rule_3 was modified by replacing the expression *xyz.com in a list for the Rule_3 with the expression *news.com, but the expression ID4 was not changed, then the new entry in IP-Domain table 380 will include the IP_Address_5, *news.com, and ID4.

In step 306 of FIG. 3B, an entry version number for the new entry is determined and assigned to the entry. The entry version number corresponds to the global version number of IP-Domain table 380. If, for example, the global version identifier is 2, then the entry version number for this particular entry is also 2. Continuing with the above example, if the global version number is 2, then the new entry would be "IP_Address_5, #news.com, ID4, Version 2."

This is depicted using an operation 322 in FIG. 3A, to show that the new entry includes "IP Address 5: *news.com ID4 Version 2."

Validation

An IP-Domain table is validated each time a new connection to any IP address is established. In an embodiment, each time a new connection to any IP address is established, each and every entry in the IP-Domain table is validated. In other embodiments, however, when a new connection to a particular IP address is established, an entry, in the IP-Domain table, that includes the particular IP address is validated, but other entries are not validated so that the amount of churn caused by the frequent updating may be reduced.

FIG. 3C is an example flow chart for validating an IP-Domain table in response to establishing a new connection to a particular IP address. In step 308, it is detected that a new connection to the particular IP address is established.

In step 310, it is determined whether IP-Domain table 380 includes any entry that has an entry version number different than the global version number of the IP-Domain table 380.

If, in step 312, it is determined that IP-Domain table 380 includes no entry that has an entry version number different than the global version number of the IP-Domain table 380, then, step 318 is performed. Otherwise, step 316 is performed.

For example, as shown in FIG. 3A, an entry that includes IP_Address_5 is the entry "IP Address 5: *news.com ID4 Version 2". The entry version number for that entry and the global version number of IP-Domain table 380 are the same. Hence, IP-Domain table 380 for that entry is up-to-date.

However, for an entry in IP-Domain Table 380 that includes IP_Address_4, the entry version number of that entry and the global version number are different. This is because the entry that includes IP_Address_4 is the entry "IP Address 4: *xyz.com ID4 Version 1", and its entry version number is 1, which is different than the global version number that is 1. Thus, the validation continues in step 316.

Generating Update Information

Continuing with the example described in FIG. 3A, as shown using an operation 324, if it is determined that IP-Domain table 380 includes one or more entries that have their corresponding entry version numbers different than the global version number of the IP-Domain table 380, then, in step 316 of FIG. 3C, the entry version numbers for those entries are updated to the global version number.

Furthermore, also in step 316 of FIG. 3C, for each of those entries, the validation process includes generating update information. The use of the update information (e.g., a "dummy packet") leverages the existing mechanisms of passing packet header information and the update information between policy engine 102 and slowpath process 140. However, any mechanism for passing packet header information that can trigger an update of the expression table may be used.

In some embodiments, update information for a particular entry includes information extracted from that particular entry and includes the IP address and the expression included in that entry.

Continuing with the above example, if the entry is "IP Address 4: *xyz.com ID4 Version 1", its entry version number is 1, which is different than the global version number that is 2. Hence the update information is generated for that entry. The update information may include IP_Address_4 and *xyz.com.

Referring again to step 316 in FIG. 3C, the update information may be communicated to a slowpath process, to cause the slowpath process to update an expression table, and more specifically, to update an entry, in the expression table, that contains the expression *xyz.com.

In the example depicted in FIG. 3A, expression table 270 does not have an entry that includes the expression *xyz.com. Hence, no entry in expression table 270 is updated. However, had expression table 270 included the expression *xyz.com, then that entry would be updated by, for example, removing, from that entry, an identifier that was included in that entry.

Referring again to FIG. 3C, once execution of step 316 is completed, in step 318, the expression table is used to enforce FQDN-based policy on the connection.

Implementation Mechanisms

The present approach may be implemented using a computing system comprising one or more processors and memory. The one or more processors and memory may be provided by one or more hardware machines.

Figure 4:
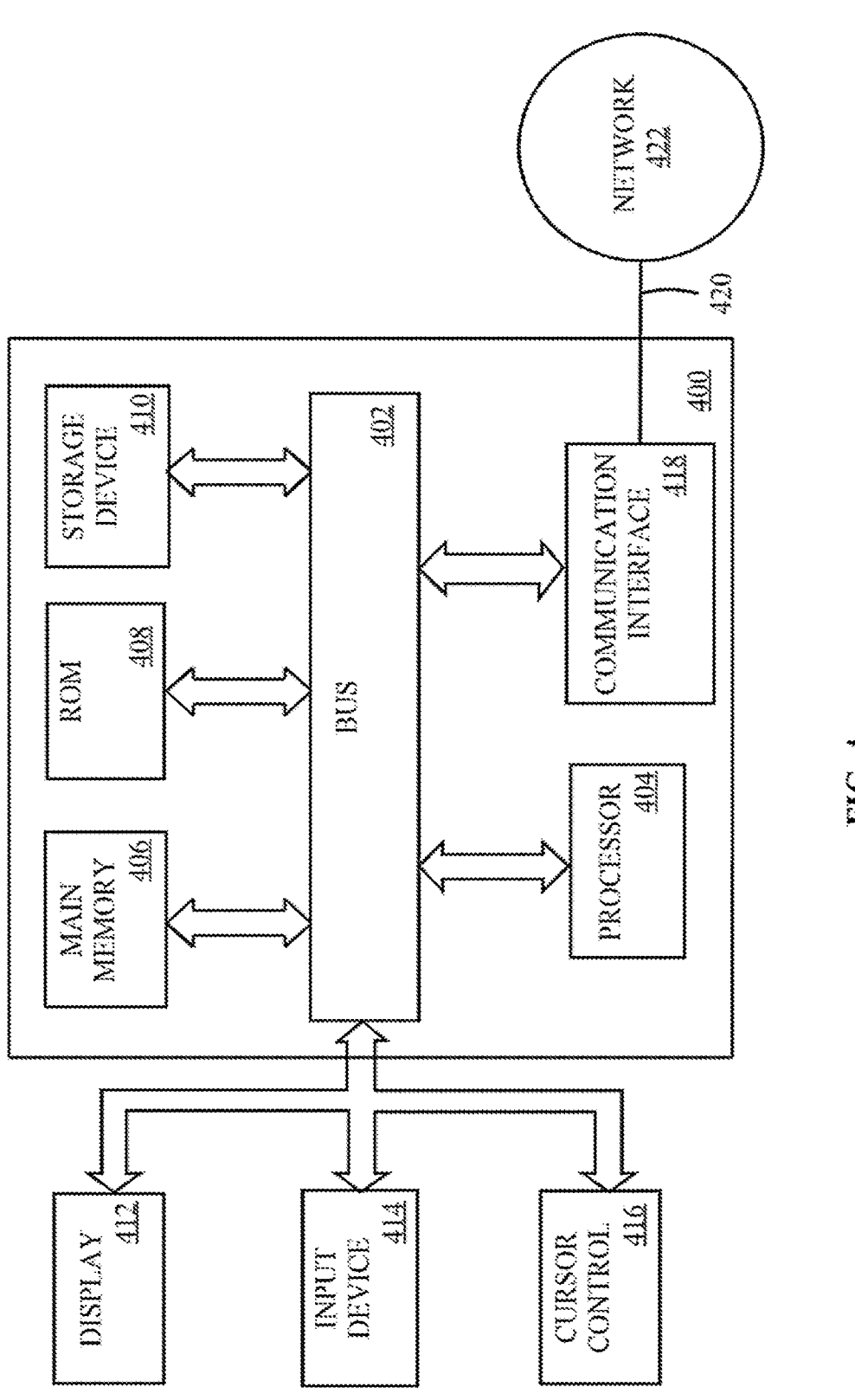
FIG. 4 depicts an example of a basic hardware machine that may be used to implement the present approach.

FIG. 4 depicts an example of a basic hardware machine that may be used to implement the present approach. Hardware machine 400 and its hardware components, including their connections, relationships, and functions, are meant to be exemplary only, and not meant to limit implementations of the present approach. Other hardware machines suitable for implementing the present approach may have different components, including components with different connections, relationships, and functions.

Hardware machine 400 includes a bus 402 or other communication mechanisms for addressing a main memory 406 and for transferring data between and among the various components of hardware machine 400.

Hardware machine 400 also includes a processor 404 coupled with bus 402 for processing information. Processor 404 may be a microprocessor, a system on a chip (SoC), or another hardware processor. Main memory 406, such as a random-access memory (RAM) or other dynamic storage device, is coupled to bus 402 for storing information and software instructions to be executed by processor 404. Main memory 406 also may be used for storing temporary variables or other intermediate information during execution of software instructions to be executed by processor 404.

Software instructions, when stored in storage media accessible to processor 404, render hardware machine 400 into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

Hardware machine 400 includes a read-only memory (ROM) 408 or other static storage device coupled to bus 402 for storing static information and software instructions for a processor 404.

A mass storage device 410 is coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Mass storage device 410 may store a body of program and data for directing operation of hardware machine 400, including an operating system, user application programs, drivers, and other support files, as well as other data files.

Hardware machine 400 may be coupled via bus 402 to a display 412, such as a liquid crystal display (LCD) or other electronic visual display, for displaying information to a computer user. A touch sensitive surface incorporating touch detection technology (e.g., resistive, capacitive, etc.) may be incorporated with display 412 to form a touch sensitive display for communicating touch gesture (e.g., finger or stylus) input to processor 404.

An input device 414 may be coupled to bus 402 for communicating information and command selections to processor 404. Input device 414 may include alphanumeric and other keys. Input device 414 may include one or more physical buttons or switches such as, for example, a power (on/off) button, a "home" button, volume control buttons, or the like.

A cursor control 416, such as a mouse, a trackball, touchpad, touch-sensitive surface, or cursor direction keys for communicating direction information and command selections to processor 404 and for controlling cursor movement on display 412, may be coupled to bus 402. Cursor control 416 may have two degrees of freedom in two axes: a first axis (e.g., x) and a second axis (e.g., y) that allow the device to specify positions in a plane. Cursor control 416 may have more degrees of freedom with a third axis (e.g., z). For example, cursor control 416 may have three translational degrees of freedom (e.g., surge, heave, and sway) in three perpendicular axes, that allows the device to specify position in the three axes. Cursor control 416 may have three rotational degrees of freedom (e.g., pitch, yaw, roll) about three perpendicular axes, that allows the device to specify an orientation about the three axes.

While one or more of display 412, input device 414, and cursor control 416 may be external components (i.e., peripheral devices) of hardware machine 400, some or all of display 412, input device 414, and cursor control 416 may be integrated as part of the form factor of hardware machine 400.

A function or operation of the present approach may be performed by hardware machine 400 in response to processor 404 executing one or more programs of software instructions contained in main memory 406. Such software instructions may be read into main memory 406 from another storage medium, such as a storage device 410. Execution of the software instructions contained in main memory 406 may cause processor 404 to perform various functions and operations.

While a function or operation of the present approach may be implemented entirely with software instructions, hard-wired or programmable circuitry of hardware machine 400 (e.g., an ASIC, a FPGA, or the like) may be used in place of or in combination with software instructions to perform the function or operation.

The term "storage media" as used herein refers to any non-transitory media that store data and/or software instructions that cause a hardware machine to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from, but may be used in conjunction with, transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor 404 for execution. For example, the software instructions may initially be carried on a magnetic disk or solid-state drive of a remote computer. The remote computer can load the software instructions into its dynamic memory and send the software instructions over a data communications network. Hardware machine 400 can receive the data over the data communications network and appropriate circuitry can place the data on bus 402. Bus 402 carries the data to main memory 406, from which processor 404 retrieves and executes the software instructions. The software instructions received by main memory 406 may optionally be stored on storage device 410 either before or after execution by processor 404.

Hardware machine 400 may include a communication interface 418 coupled to bus 402. Communication interface 418 provides a two-way data communication coupling to a wired or wireless network link 420 that connects hardware machine 400 to a data communications network 422 (e.g., a local area network (LAN), a wide area network (WAN), a wireless local area network (WLAN), a metropolitan area network (MAN), a storage area network (SAN), etc.). Network link 420 provides data communication through network 422 to one or more other networked devices.

Communication interface 418 may send and receive electrical, electromagnetic, or optical signals that carry digital data streams representing various types of information. For example, communication interface 418 may be implemented by a wired network interface card, a wireless network interface card with an integrated radio antenna, or a modem.

Network link 420 may provide a connection through network 422 to a host computer or to data equipment operated by an Internet Service Provider (ISP). The ISP may in turn provide data communication services through the world-wide packet data communication network now commonly referred to as the Internet. Network 422 and the Internet use electrical, optical or electromagnetic signals that carry digital data streams. The signals through the various networks and the signals on network link 420 and through communication interface 418, which carry the digital data to and from hardware machine 400, are example forms of transmission media.

Hardware machine 400 can send messages and receive data, including program code, through network 422, network link 420, and communication interface 418. In the Internet example, a server might transmit a requested code for an application program through Internet, ISP, and network 422 and communication interface 418.

GENERAL CONSIDERATIONS

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings.

16

What is claimed is:

1. A method comprising:

in response to detecting a new expression in a policy rule of a distributed firewall (DFW), updating a global version number to a new value, wherein the new expression is a regular expression;

identifying a particular IP address that corresponds to a fully-qualified domain name (FQDN) matching on the new expression;

storing an entry comprising the particular IP address, the new expression, and an entry version number in a first data structure, the entry version number being assigned the new value;

in response to detecting a new connection to a destination IP address:

finding a matching entry in the first data structure corresponding to the destination IP address;

determining whether the global version number matches the entry version number for the matching entry; and in response to determining that the global version number does not match the entry version number for the matching entry, sending update information to a slowpath process that associates an updated configuration information for the matching entry, the update information comprising the destination IP address and a regular expression of the matching entry, to cause the slowpath process to update a second data structure.

2. The method of claim 1, wherein the identifying a particular IP address that corresponds to an FQDN matching on the new expression comprises inspecting DNS response packets using a deep packet inspection approach.

3. The method of claim 1, wherein the update information is sent to a slowpath process by communicating a pointer to a descriptor of the update information to the slowpath process.

4. The method of claim 1, wherein the detecting a new expression in a policy rule comprises detecting that the policy rule, stored in a firewall policy, has been modified by replacing, in the policy rule, an old expression with the new expression.

5. The method of claim 1, wherein the detecting a new expression in a policy rule comprises detecting that the policy rule is a new rule stored in a firewall policy.

6. The method of claim 1, wherein the identifying a particular IP address that corresponds to an FQDN matching on the new expression further comprises identifying, in the second data structure, an expression entry that includes the new expression that matches on the FQDN; determining an expression identifier associated with the expression entry; and storing, in the first data structure, the expression identifier in the entry that also comprises the particular IP address, the new expression, and the entry version number.

7. The method of claim 1, wherein the policy rule is provided by a management plane or a local management plane.

8. One or more non-transitory computer-readable storage media storing one or more computer instructions which, when executed by one or more processors, cause the one or more processors to perform:

in response to detecting a new expression in a policy rule of a distributed firewall (DFW), updating a global version number to a new value;

identifying a particular IP address that corresponds to an a fully-qualified domain name (FQDN) matching on the new expression;

storing an entry comprising the particular IP address, the new expression, and an entry version number in a first data structure, the entry version number being assigned the new value;

in response to detecting a new connection to a destination IP address:

finding a matching entry in the first data structure corresponding to the destination IP address;

determining whether the global version number matches the entry version number for the matching entry; and in response to determining that the global version number does not match the entry version number for the matching entry, sending update information to a slowpath process that associates an updated configuration information for the matching entry, the update information comprising the destination IP address and regular expression of the matching entry, to cause the slowpath process to update a second data structure.

9. The one or more non-transitory computer-readable storage media of claim 8, wherein the identifying a particular IP address that corresponds to an FQDN matching on the new expression comprises inspecting DNS response packets using a deep packet inspection approach.

10. The one or more non-transitory computer-readable storage media of claim 8, wherein the update information is sent to a slowpath process by communicating a pointer to a descriptor of the update information to the slowpath process.

11. The one or more non-transitory computer-readable storage media of claim 8, wherein the detecting a new expression in a policy rule comprises detecting that the policy rule, stored in a firewall policy, has been modified by replacing, in the policy rule, an old expression with the new expression.

12. The one or more non-transitory computer-readable storage media of claim 8, wherein the detecting a new expression in a policy rule comprises detecting that the policy rule is a new rule stored in a firewall policy.

13. The one or more non-transitory computer-readable storage media of claim 8, wherein the identifying a particular IP address that corresponds to an FQDN matching on the new expression further comprises identifying, in the second data structure, an expression entry that includes the new expression that matches on the FQDN; determining an expression identifier associated with the expression entry; and storing, in the first data structure, the expression identifier in the entry that also comprises the particular IP address, the new expression, and the entry version number.

14. The one or more non-transitory computer-readable storage media of claim 8, wherein the policy rule is provided by a management plane or a local management plane.

15. A hypervisor implemented in a host computer and configured to implement a method for revalidating FQDN rulesets in a distributed firewall, the hypervisor comprising:

one or more processors;

one or more memory units; and one or more non-transitory computer-readable storage media storing one or more computer instructions which, when executed by the one or more processors, cause the one or more processors to perform:

in response to detecting a new expression in a policy rule of a distributed firewall (DFW), updating a global version number to a new value;

identifying a particular IP address that corresponds to an a fully-qualified domain name (FQDN) matching on the new expression;

storing an entry comprising the particular IP address, the new expression, and a entry version number in a first data structure, the entry version number being assigned the new value;

in response to detecting a new connection to a destination IP address:

finding a matching entry in the first data structure corresponding to the destination IP address;

determining whether the global version number matches the entry version number for the matching entry; and in response to determining that the global version number does not match the entry version number for the matching entry, sending update information to a slowpath process that associates an updated configuration information for the matching entry, the update information comprising the destination IP address and regular expression of the matching entry, to cause the slowpath process to update a second data structure.

16. The hypervisor of claim 15, wherein the identifying a particular IP address that corresponds to an FQDN matching on the new expression comprises inspecting DNS response packets using a deep packet inspection approach.

17. The hypervisor of claim 15, wherein the update information is sent to a slowpath process by communicating a pointer to a descriptor of the update information to the slowpath process.

18. The hypervisor of claim 15, wherein the detecting a new expression in a policy rule comprises detecting that the policy rule, stored in a firewall policy, has been modified by replacing, in the policy rule, an old expression with the new expression.

19. The hypervisor of claim 15, wherein the detecting a new expression in a policy rule comprises detecting that the policy rule is a new rule stored in a firewall policy.

20. The hypervisor of claim 15, wherein the identifying a particular IP address that corresponds to an FQDN matching on the new expression further comprises identifying, in the second data structure, an expression entry that includes the new expression that matches on the FQDN; determining an expression identifier associated with the expression entry; and storing, in the first data structure, the expression identifier in the entry that also comprises the particular IP address, the new expression, and the entry version number.

* * * * *